(12) United States Patent
Mielenz et al.

(10) Patent No.: US 10,393,531 B2
(45) Date of Patent: Aug. 27, 2019

(54) METHOD FOR PROVIDING AN ITEM OF LOCALIZATION INFORMATION FOR LOCALIZING A VEHICLE AT A LOCALIZATION LOCATION, AND METHOD FOR PROVIDING AT LEAST ONE ITEM OF INFORMATION FOR THE LOCALIZING OF A VEHICLE BY ANOTHER VEHICLE

(71) Applicant: Robert Bosch GmbH, Stuttgart (DE)

(72) Inventors: Holger Mielenz, Ostfildern (DE); Jan Rohde, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 127 days.

(21) Appl. No.: 15/603,773

(22) Filed: May 24, 2017

(65) Prior Publication Data

US 2017/0370730 A1 Dec. 28, 2017

(30) Foreign Application Priority Data

Jun. 27, 2016 (DE) .................. 10 2016 211 420

(51) Int. Cl.
*G01C 21/32* (2006.01)

(52) U.S. Cl.
CPC ................... *G01C 21/32* (2013.01)

(58) Field of Classification Search
CPC ....................................... G01C 21/32
USPC ......................................... 701/445
See application file for complete search history.

(56) References Cited

U.S. PATENT DOCUMENTS

| 8,301,374 B2 * | 10/2012 | Surampudi | G01C 21/12 701/23 |
| 2018/0038694 A1 * | 2/2018 | Bruemmer | G01S 13/0209 |
| 2018/0245928 A1 * | 8/2018 | Knorr | G01C 21/30 |
| 2018/0307925 A1 * | 10/2018 | Wisniowski | G06K 9/00825 |

* cited by examiner

*Primary Examiner* — Yazan A Soofi
(74) *Attorney, Agent, or Firm* — Norton Rose Fulbright US LLP; Gerard Messina (57) ABSTRACT

A method for providing an item of localization information for the localization of a further vehicle at a localization location. An item of precision information is read in that represents a degree of localization precision achieved in the localization of another vehicle at the localization location. In a further step, the item of localization information is outputted to an interface at the further vehicle, using the item of precision information.

12 Claims, 6 Drawing Sheets

METHOD FOR PROVIDING AN ITEM OF LOCALIZATION INFORMATION FOR LOCALIZING A VEHICLE AT A LOCALIZATION LOCATION, AND METHOD FOR PROVIDING AT LEAST ONE ITEM OF INFORMATION FOR THE LOCALIZING OF A VEHICLE BY ANOTHER VEHICLE

CROSS REFERENCE

The present application claims the benefit under 35 U.S.C. § 119 of German Patent Application No. DE 102016211420.4 filed on Jun. 27, 2016, which is expressly incorporated herein by reference in its entirety.

BACKGROUND INFORMATION

The present invention relates to a device, method and computer program.

Conventional methods are available for the localization of vehicles in digital maps on the basis of environmental sensor data. For the evaluation, the environmental sensor data can for example be received and stored by a central server.

SUMMARY

An example embodiment of the present invention provides a method for providing an item of localization information for localizing a vehicle at a localization location, a method for providing at least one item of information for the localization of a vehicle by another vehicle, as well as a control device that uses at least one of these methods, as well as, finally, a corresponding computer program. Through the measures described herein, advantageous developments and improvements of the device are possible.

An example method is provided for providing an item of localization information for localizing a further vehicle at a localization location, the method including the following steps:

reading in an item of precision information that represents the precision of the localization achieved in the localization of another vehicle at the localization location; and outputting the localization information to an interface to the further vehicle, using the item of precision information.

The method can be realized for example using a data processing device that can communicate, via interfaces, with a plurality of vehicles. The item of precision information can have been determined using a device of the other vehicle. In this way, the item of precision information can be read in via an interface to the other vehicle. The item of localization information can for example represent at least one landmark assigned to the localization location, or a digital map including the localization location. A named vehicle can be a motor vehicle, in particular for example a partially or highly automated vehicle. The localization precision can for example represent a deviation between an actual position and a position ascertained for example by a sensor or a digital map of the other vehicle at the localization location. A localization location can be understood as a location at which the vehicle is to be localized. The localization location can for example include at least one landmark. The interface can for example be an interface of a vehicle-external data processing device. The further vehicle and the other vehicle can be capable of being connected to one another via the data processing device. This type of communication can also be designated car-to-infrastructure communication.

Depending on the specific embodiment, in the step of outputting the localization information can be produced using the precision information. For example, the localization information can be produced in such a way that it includes only a determined number of landmarks, as a function of the localization precision.

The approach presented here is based on the recognition that through the evaluation of a degree of precision with which a first vehicle has been localized at a particular location at a first time, an item of localization information for localizing a second vehicle that is traveling past the location at a second time can be produced and can be sent to the second vehicle. The precision can be evaluated by a vehicle-external data processing device, such as a central backend system. Advantageously, the item of localization information can be sent to the second vehicle for example only when the precision corresponds to a specified minimum degree of precision. In this way, memory and computing efficiency in the localization of the second vehicle can be improved.

For example, the approach presented here enables the efficient localization of automated vehicles in digital maps, using a vehicle-bound environmental sensor system. Here, for example the degree of precision or confidence of the localization of individual vehicles can be mapped and aggregated at each time step on the backend system in order to produce a so-called quality of service map. The advantage of such a method for producing quality of service maps for optimizing storage and computing resources in the localization of vehicles results from, inter alia, the fact that for example when a location is traveled through again, on the basis of the quality of service map landmarks can be transmitted by the backend system into the digital map of the respective vehicle only at those locations at which a sufficiently high localization quality can be expected.

According to a specific embodiment, in a step of comparison, the degree of localization precision can be compared with a reference degree of precision using the item of precision information, in order to ascertain a deviation between the localization precision and the reference precision. Here, the step of outputting the item of localization information can be outputted as a function of the deviation. In this way, the method can include a step of determining a deviation between the localization precision and the reference precision. For example, the item of localization information can be outputted if in the step of comparison it turns out that the localization precision is greater than or equal to the reference precision. A reference degree of precision can be understood as a minimum degree of precision that is required for the precise and reliable localization of a vehicle. Through this specific embodiment, with low computing outlay it can be ascertained whether the localization precision represented by the item of precision information is sufficient for a precise localization of the further vehicle.

According to a further specific embodiment, in the step of reading in an item of landmark information that represents at least one landmark used in the localization of the other vehicle is additionally read in. In the step of outputting, the item of localization information can further be outputted using the landmark information. A landmark can be understood as a distinctive location in an environment around the other vehicle. For example, the landmark can be an intersection, a traffic light, a tree, or a similar conspicuous structure in the environment. Through this specific embodiment, the efficiency of the method can be increased.

Here, in the step of outputting, an item of information representing the landmark can be outputted as the item of localization information. In this way, a localization of the further vehicle is enabled using the landmark used by the other vehicle.

It is advantageous if, in the step of reading in, at least one further item of precision information is additionally read in. The further item of precision information can represent a degree of localization precision achieved in the localization of at least one third vehicle at at least one third localization location. In the step of outputting, in addition at least one third item of localization information for localizing the vehicle at the third localization location can be outputted to the interface using the third item of precision information. The third localization location can be a location differing from the localization location. The third vehicle can for example be the other vehicle, or a vehicle differing from the other vehicle. Through this specific embodiment, items of localization information can be efficiently provided for different localization locations.

Here, in a step of creation, a precision map can be produced using the item of precision information and the third item of precision information. In the step of outputting, the item of localization information or, in addition or alternatively, the third item of localization information can be outputted using the precision map. A precision map, also referred to as a quality of service map, can be understood as a digital map relating to a quality of localization in a particular geographic area. In this way, different locations in the precision map can be assigned different degrees of localization precision. This specific embodiment enables an efficient and rapid outputting of a plurality of items of localization information.

According to a further specific embodiment, in the step of reading in an item of sensor information that represents at least one sensor used in the localization of the other vehicle is further read in. The item of sensor information can additionally or alternatively represent a sensor used in the localization of the third vehicle. Here, in the step of creating, the precision map can in addition be created using the sensor information. In this way, the precision map can be assigned to a particular sensor or a particular sensor configuration, thus enabling a sensor-dependent evaluation of the degrees of precision of localization.

In addition, in the step of reading in, at least one additional item of precision information that represents a degree of localization achieved in the localization of at least one additional vehicle at the localization location can in addition be read in. Correspondingly, in the step of outputting the localization information can further be outputted using the additional precision information. The additional vehicle can be a vehicle differing from the further vehicle and from the other vehicle. Through this specific embodiment, different degrees of localization precision relating to the localization location can be taken into account in the outputting of the localization information.

Here, in a step of ascertaining, using the precision information and the additional precision information, an average degree of localization precision relating to the localization location can be ascertained. In the step of outputting, the localization information can be outputted as a function of the average localization precision. In this way, different degrees of localization precision relating to one and the same localization location can easily be linked with one another.

The approach described here additionally creates a method for providing at least one item of information for the localization of a further vehicle by another vehicle, the method including the following steps:

reading in an environmental sensor signal that represents a signal produced by an environmental sensor of the other vehicle;

localization of the other vehicle at a localization location using the environmental sensor signal;

ascertaining a degree of localization precision achieved in the localization of the other vehicle in order to obtain an item of precision information; and outputting of the item of precision information to an interface to a vehicle-external data processing device for providing an item of localization information for localizing the further vehicle at the localization location using the item of precision information.

The steps of reading in, localizing, and ascertaining can be carried out using devices of the other vehicle. An environmental sensor can be understood for example as a camera or as a radar, lidar, or ultrasound sensor. The environmental sensor signal can be read in via a vehicle-internal interface of the other vehicle. The interface can be for example a communication interface for wireless data exchange via an Internet connection or via a mobile radiotelephone connection.

It is advantageous if, in the step of ascertaining, using the environmental sensor signal in addition at least one landmark used in the localization of the other vehicle is ascertained in order to obtain an item of landmark information. In addition or alternatively, in the step of ascertaining at least one sensor used in the localization of the other vehicle is ascertained in order to obtain an item of sensor information. Here, in the step of outputting, in addition the landmark information or, in addition or alternatively, the sensor information can be outputted to the interface. In this way, the efficiency and the precision in the localization of the further vehicle can be further increased.

These methods can be implemented for example in software or in hardware, or in a mixed form of software and hardware, for example in a control device.

The approach presented here further provides a control device that is fashioned to carry out, control, or realize the steps of a variant of a method presented here in corresponding devices. Through this variant embodiment of the present invention in the form of a control device as well, the object of the present invention can be quickly and efficiently achieved.

For this purpose, the control device can have at least one computing unit for processing signals or data, at least one storage unit for storing signals or data, at least one interface to a sensor or to an actuator for reading in sensor signals from the sensor or for outputting control signals to the actuator, and/or at least one communication interface for reading in or outputting data that are embedded in a communication protocol. The computing unit can for example be a signal processor, a microcontroller, or the like, and the storage unit can be a flash memory, an EPROM, or a magnetic storage unit. The communication interface can be fashioned to read in or output data wirelessly and/or in wire-bound fashion, and a communication interface that can read in or output the wire-bound data can for example electrically or optically read in these data from a corresponding data transmission line or can output them to a corresponding data transmission line.

In the present context, a control device can be understood as an electrical device that processes sensor signals and outputs control signals and/or data signals as a function thereof. The control device can have an interface that can be fashioned as hardware and/or as software. In the case of a realization as hardware, the interfaces can for example be part of a so-called system ASIC that contains a wide variety of functions of the control device. However, it is also possible for the interfaces to be separate integrated circuits, or to be made up at least partly of discrete components. In the case of a realization as software, the interfaces can be software modules present for example on a microcontroller alongside other software modules.

In an advantageous embodiment, the control device realizes a controlling of the vehicle, for example using an engine control device or a steering actuator or a brake actuator of the vehicle. For this purpose, the control device can access sensor signals such as acceleration sensor signals, environmental sensor signals, or steering angle sensor signals.

Also advantageous is a computer program product or computer program having program code that can be stored on a machine-readable carrier or storage medium such as a semiconductor memory, a hard drive memory, or an optical memory, and that is used to carry out, realize, and/or control the steps of the method according to one of the specific embodiments described above, in particular when the program product or program is executed on a computer or on a device.

Exemplary embodiments of the present invention are shown in the figures and are explained in more detail below.

BRIEF DESCRIPTION OF THE DRAWINGS

FIG. 6 shows a flow diagram of a method according to an exemplary of.

DETAILED DESCRIPTION OF EXAMPLE EMBODIMENTS

In the description below of advantageous exemplary embodiments of the present invention, identical or similar reference characters are used for elements shown in the various Figures and having similar function, and repeated description of these elements is omitted.

Figure 1:
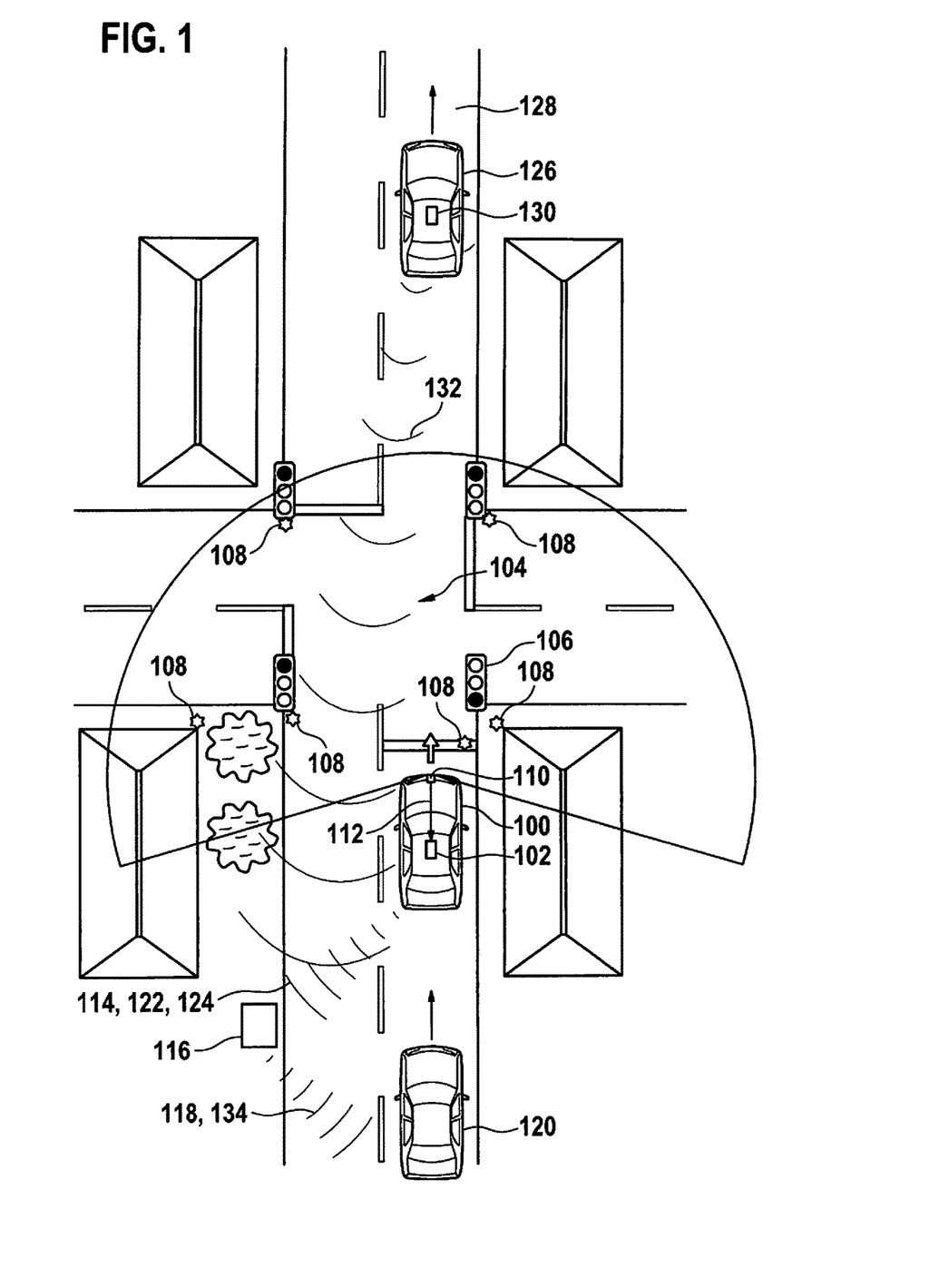
FIG. 1 shows a schematic representation of another vehicle having a control device according to an exemplary embodiment.

FIG. 1 shows a schematic representation of another vehicle 100 having a control device 102 according to an exemplary embodiment. Other vehicle 100, for example a more highly automated vehicle, is situated in the area of entry to an intersection 104, in front of a traffic light 106. A plurality of landmarks 108 are situated at intersection 104. Landmarks 108 include for example traffic light 106, posts, lampposts, corners of buildings, or roadway markings. Other vehicle 100 is equipped with an environmental sensor 110 that, according to this exemplary embodiment, is fashioned to acquire landmarks 108 in the environment surrounding other vehicle 100 and to send an environmental sensor signal 112, representing landmarks 108, to control device 102. Control device 102 is fashioned to localize other vehicle 100 at intersection 104, using environmental sensor signal 112. For example, using environmental sensor signal 112 control device 102 extracts landmarks 108 in order to localize other vehicle 100 in digital maps. In this sense, intersection 104 can also be designated the localization location. Here, control device 102 ascertains a degree of localization precision with which other vehicle 100 is localized at intersection 104, and produces an item of precision information 114 representing the localization precision. Control device 102 sends the item of precision information 114 to a vehicle-external data processing device 116, such as a backend system.

Data processing device 116 is fashioned to output, using precision information 114, an item of localization information 118 for localizing a further vehicle 120 at intersection 104. In FIG. 1, as an example further vehicle 120 is shown as a vehicle following other vehicle 100. For example, data processing device 116 outputs localization information 118 to further vehicle 120 only if an evaluation of precision information 114 yields the result that other vehicle 100 was previously localized at intersection 104 with a sufficient degree of localization precision.

According to an exemplary embodiment, control device 102 is fashioned to transmit to data processing device 116, using environmental sensor signal 112, in addition to precision information 114 an item of landmark information 122 that represents at least one landmark 108 acquired by environmental sensor 106. Here, landmark information 122 includes for example only those acquired landmarks 108 that were used by control device 102 for the localization of other vehicle 100. Correspondingly, data processing device 116 is fashioned to further output localization information 118 using landmark information 122. In particular, data processing device 116 uses landmark information 122 to produce an item of information as localization information 118 that represents the landmarks used in the localization of other vehicle 100. These landmarks represented by localization information 118 can thus be used again by further vehicle 120 for the localization of further vehicle 120 at intersection 104.

According to a further exemplary embodiment, control device 102 ascertains, for example using environmental sensor signal 112, which sensors of other vehicle 100 are involved in the localization of other vehicle 100 at intersection 104. As a result of this ascertaining, control device 102 sends a corresponding item of sensor information 124, which for example represents environmental sensor 110, to data processing device 116. This device uses sensor information 124 as additional information for creating item of localization information 118.

FIG. 1 further shows a third vehicle 126 that is moving away from intersection 104 on a street segment 128 that goes into intersection 104. Analogously to other vehicle 100, third vehicle 126 has a third control device 130 that is fashioned to localize third vehicle 126 in street segment 128, and to transmit a third item of precision information 132 that represents a degree of localization precision achieved in the localization of third vehicle 126 to data processing device 116. Street segment 128 is thus a third localization location. Data processing device 116 evaluates third item of precision information 132. If the evaluation yields the result that the localization of third vehicle 126 has taken place with sufficient precision, then data processing device 116 sends a third item of localization information 134 to further vehicle 120, which can then be used by further vehicle 120 for the localization of further vehicle 120 at the third localization location, i.e., in street segment 128. For example, data processing device 116 sends third item of localization information 134 to further vehicle 120 when further vehicle 120 passes through street segment 128.

In the following, individual steps of a localization of further vehicle 120 are again summarized using other words.

First, control device 102 sends the degree of localization precision or confidence, in the form of the item of precision information 114, geo-referenced, to data processing unit 116, for example a server. Data processing unit 116 aggregates the data of different clients in such a way that quality of service maps are produced, using which a preliminary selection can be made of relevant landmarks that can be sent to further vehicle 120 by data processing device 116. For example, the landmarks to be sent by data processing device 116 are selected in such a way that landmarks are sent only for those geographic locations at which a sufficiently precise localization can be achieved, or, for a geographic location only those landmarks are sent that can make a positive contribution to the localization of further vehicle 120.

A system for localizing further vehicle 120 includes, inter alia, for example the following features:

environmental sensor 110 for acquiring landmarks 108;

a transmission unit for receiving and sending digital maps and features for aggregation on a server;

a unit for carrying out a method for matching onboard landmarks with digital maps;

a unit for carrying out a method for localization in digital maps;

a unit for carrying out a method for estimating a quality measure or a degree of precision of a localization;

a backend server having a computing unit for the geographic aggregation of precision information 114; and a system for sending information to a client that is to be localized.

The required computing resources can be significantly reduced by enabling or carrying out localization steps only at those locations at which a sufficiently high degree of localization precision can be reached. In addition, the required memory resources can be reduced because only a relatively small number of landmarks is processed. In addition, the required data rate can be reduced by reducing the number of required localization steps and the respective landmarks.

According to an exemplary embodiment, in addition to the localization precision or the confidence at each time step, control device 102 also communicates those of the landmarks 108 that other vehicle 100 has actually used for localization, so that an optimization based on the actually required landmarks can be carried out at the backend, in the form of data processing device 116, and this optimization can be used for a subsequent localization of further vehicle 120.

The landmarks to be transmitted are for example selected as a function of the visibility of landmarks 108 for environmental sensor 110.

Figure 2:
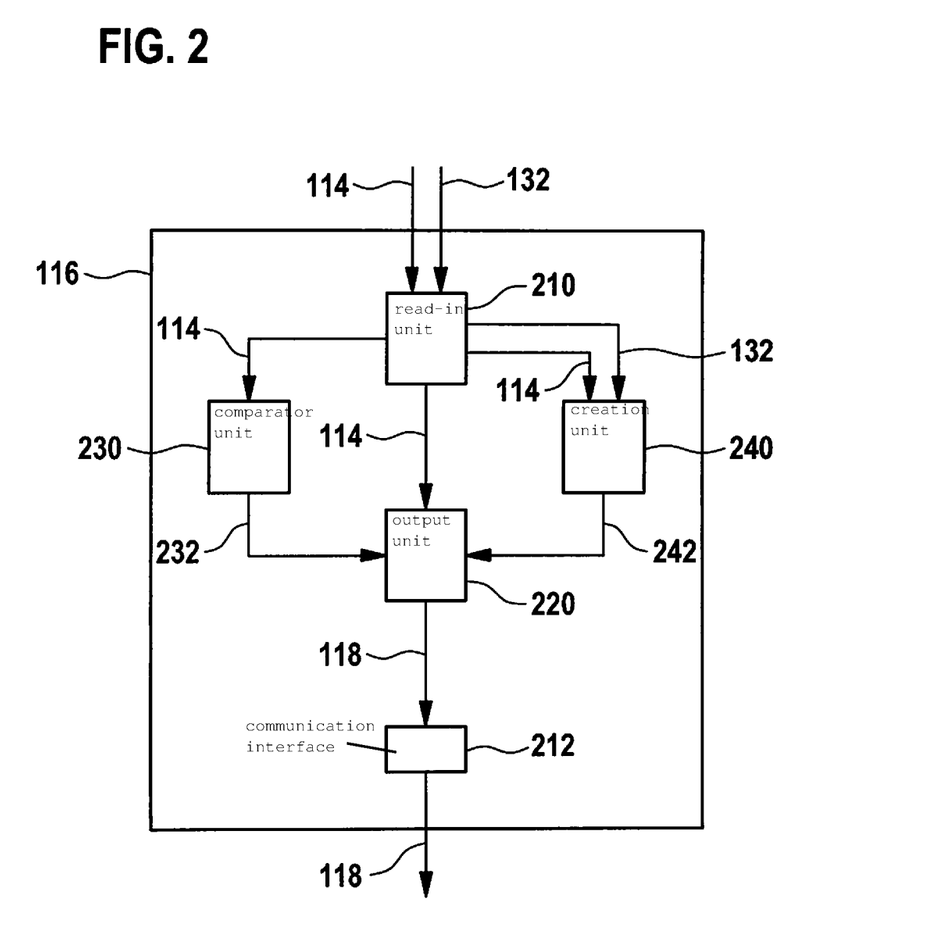
FIG. 2 shows a schematic representation of a data processing device according to an exemplary embodiment.

FIG. 2 shows a schematic representation of a data processing device 116 according to an exemplary embodiment, such as a data processing device as described above on the basis of FIG. 1. Data processing device 116 includes a read-in unit 210 for reading in precision information 114, as well as an output unit 220 for outputting localization information 118 using precision information 114. Data processing device 116 is further realized with a communication interface 212 that is used to transmit localization information 118 to the vehicle to be localized. Communication interface 212 is for example realized as an interface for wireless communication with the vehicle.

According to an exemplary embodiment, data processing device 116 includes a comparator unit 230 that is fashioned to generate, using precision information 114, a deviation value 232 that represents a deviation between the localization precision and a reference degree of precision, and to forward this value to output unit 220. Output unit 220 is fashioned to output localization information 118 using deviation value 232. The reference precision is defined for example as a minimum value that represents a required minimum degree of precision for the reliable and precise localization of the vehicle. Thus, output unit 220 for example outputs localization information 118 only when an evaluation of deviation value 232 yields the result that the degree of localization precision represented by precision information 114 is equal to or greater than the reference degree of precision.

Optionally, data processing device 116 is realized having a creating unit 240 for creating a precision map, also called a quality of service map, using the item of precision information 114 and the third item of precision information 132. Creation unit 240 is further fashioned to send an item of map information 242 representing the precision map to output unit 220, output unit 220 being fashioned to use map information 242 to produce or send localization information 118.

Figure 3:
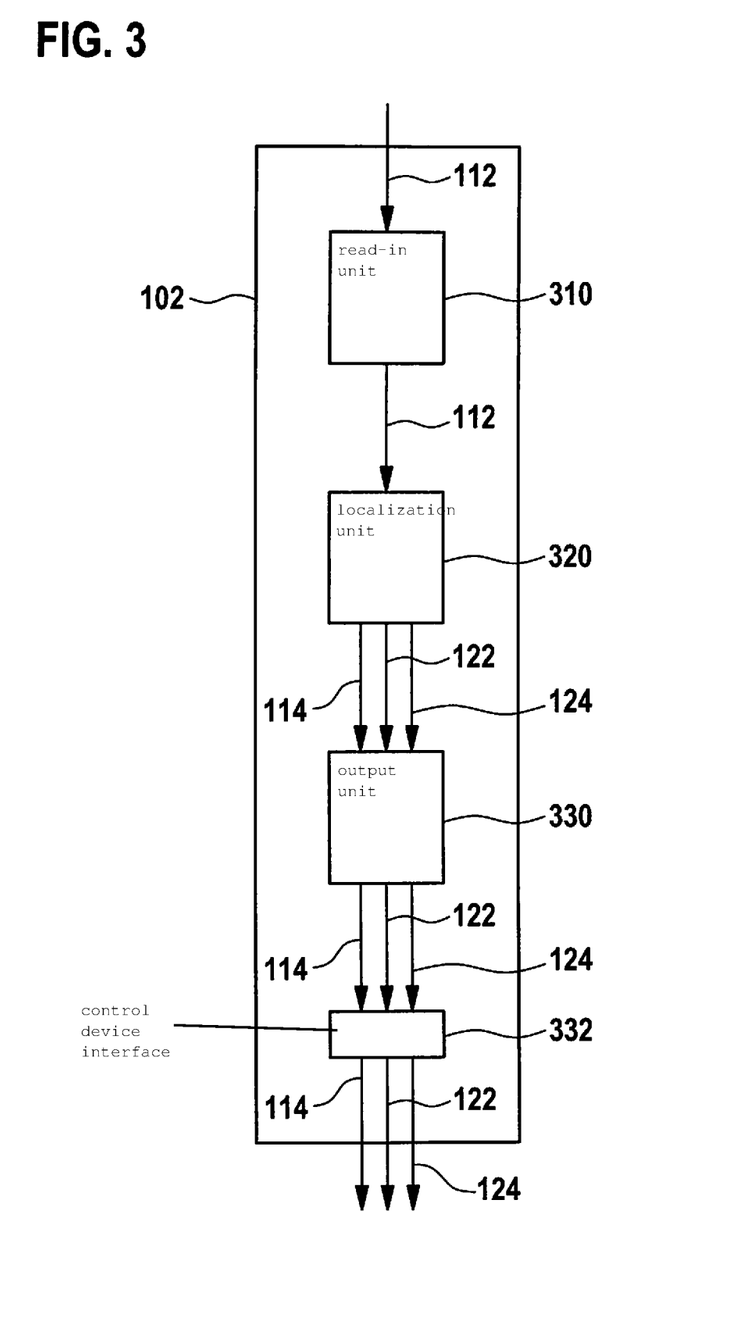
FIG. 3 shows a schematic representation of a control device according to an exemplary embodiment.

FIG. 3 shows a schematic representation of a control device 102 according to an exemplary embodiment, for example a control device as described above on the basis of FIG. 1. Control device 102 includes a read-in unit 310 for reading in environmental sensor signal 112. A localization unit 320 of control device 102 is fashioned to localize the other vehicle using environmental sensor signal 112. Here, localization unit 320 produces the item of precision information 114, which represents the degree of localization precision achieved in the localization of the other vehicle. An output unit 330 is fashioned to output precision information 114 to the vehicle-external data processing device. For the transmission of precision information 114 to the data processing device, control device 102 is realized having a control device interface 332, for example for wireless communication with the data processing device.

Optionally, localization unit 320 is fashioned to produce, in addition to precision information 114, landmark information 122, or also sensor information 124, and to forward these to output unit 330 for transmission to data processing device 116.

Figure 4:
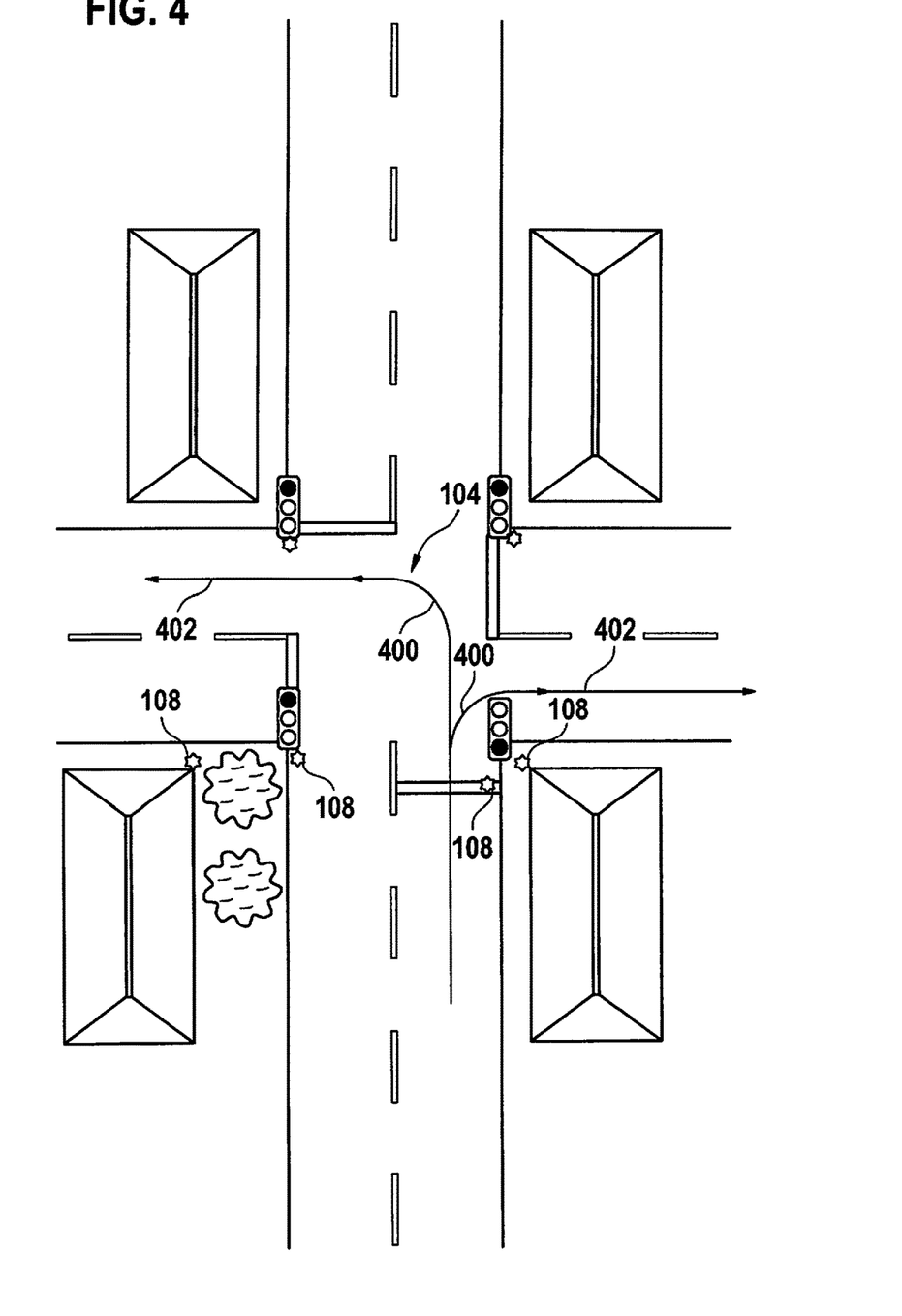
FIG. 4 shows a schematic representation of an intersection from FIG. 1.

FIG. 4 shows a schematic representation of an intersection 104 of FIG. 1. Shown is the result of an aggregation, carried out by the data processing device, of individual localization steps of different vehicles which, in a defined time interval, have traveled different traffic routes 400, 402 in the region of intersection 104. Here, for example an average degree of localization precision is ascertained per geographic location, i.e., per localization location, for example with decimeter resolution. Here, the data processing device is for example fashioned to make classifications between "sufficiently precise" or "too imprecise." For example, in FIG. 4 traffic routes 400 are classified as "too imprecise," while traffic paths 402 are classified as "sufficiently precise." This knowledge is used during the operation of the data processing device to transmit the relevant landmarks 108 only for those positions at which a sufficiently precise localization can take place.

Figure 5:
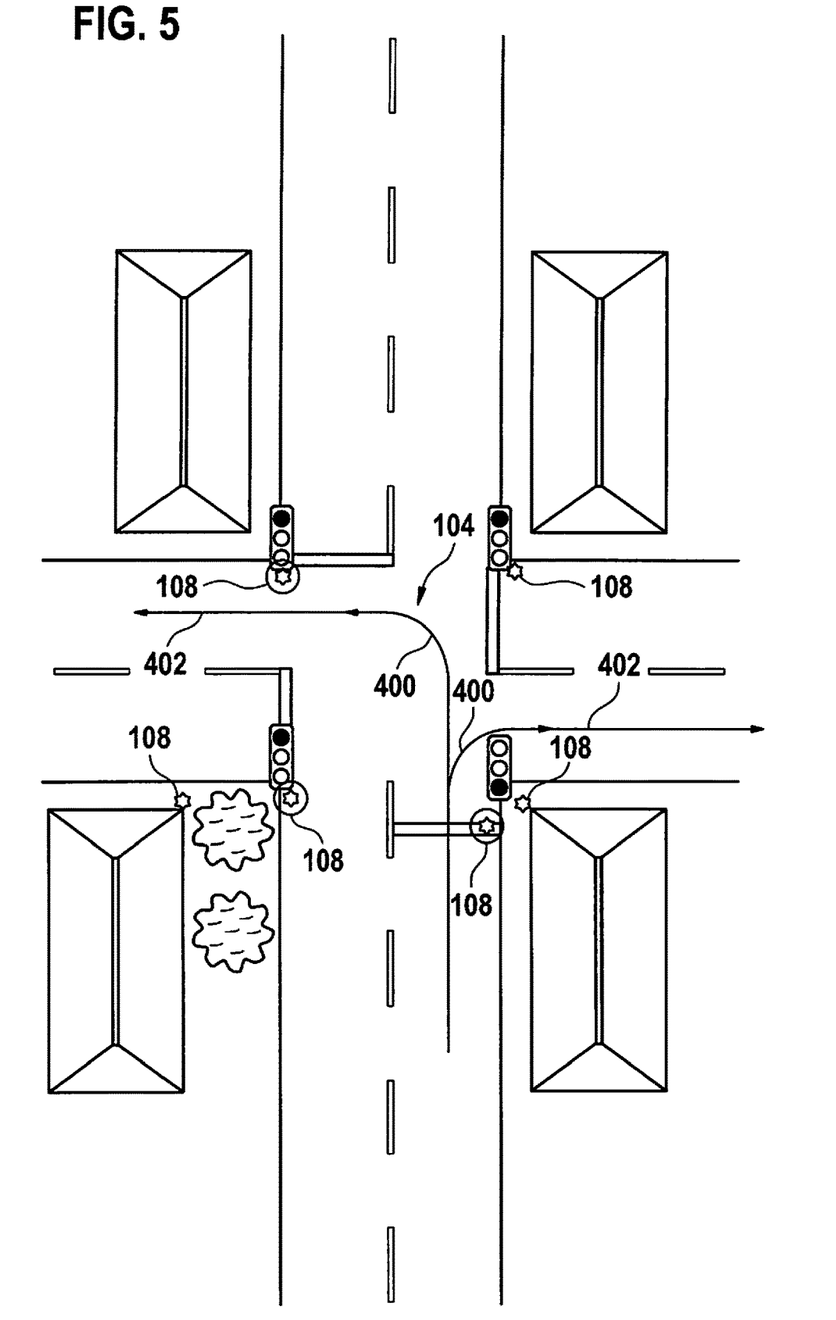
FIG. 5 shows a schematic representation of an intersection from FIG. 4.

FIG. 5 shows a schematic representation of an intersection 104 of FIG. 4. Differing from FIG. 4, in FIG. 5 landmarks 108 relevant for the localization of the vehicle are each marked with a circle. Shown is, again, the result of an evaluation of landmarks 108 after their use for a sufficiently good localization at a given time step. Thus, according to FIG. 5 the circled landmarks 108 are required to obtain a sufficiently good localization, whereas the landmarks 108 that are not circled cannot make an adequate contribution, for example due to being occluded by a bush. The data processing device aggregates these evaluations for the optimized sending of landmarks to vehicles that are to be localized.

Figure 6:
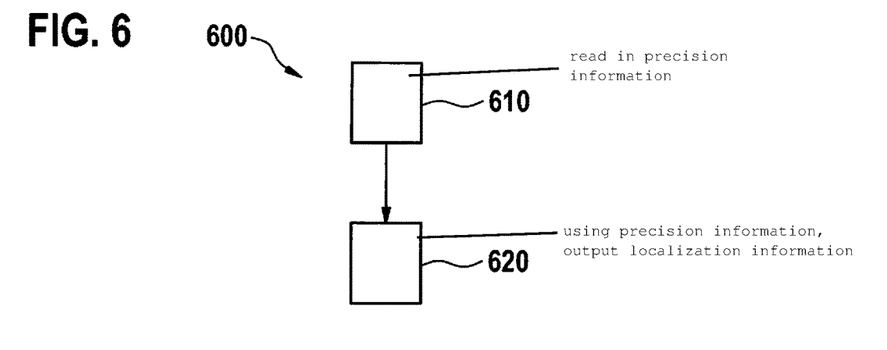

FIG. 6 shows a flow diagram of a method 600 according to an exemplary embodiment. Method 600 can for example be carried out by a data processing device as described above on the basis of FIGS. 1 through 5. Method 600 includes a step 610 in which the precision information is read in. In a further step 620, using the precision information the localization information is outputted to the communication interface to the vehicle to be localized.

According to an exemplary embodiment, method 600 includes an optional step for creating quality of service maps for the localization. Using such maps, also referred to as precision maps above, memory and computing resources can be used particularly efficiently for the localization.

According to a further exemplary embodiment, the quality of service maps are created separately for each sensor configuration, using the sensor information, so that for example different maps are created for vehicles having video and radar sensors and for vehicles having radar and lidar sensors.

Figure 7:
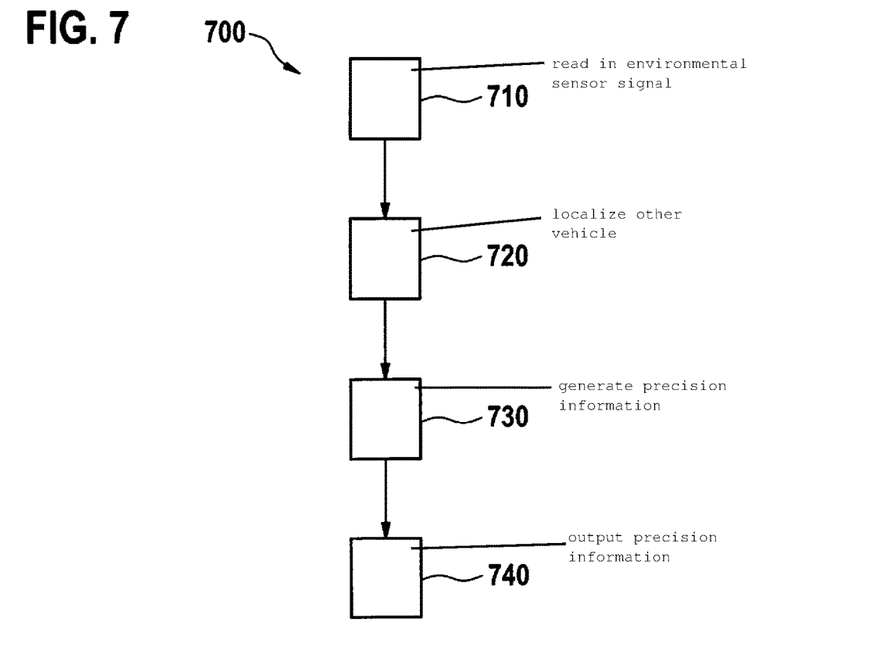
FIG. 7 shows a flow diagram of a method according to an exemplary embodiment.

FIG. 7 shows a flow diagram of a method 700 according to an exemplary embodiment. Method 700 can for example be carried out by a control device as described above on the basis of FIGS. 1 through 5. Here, in a step 710 the environmental sensor signal of the environmental sensor of the other vehicle is read in. In a further step 720, the other vehicle is localized using the environmental sensor signal. In step 730, the precision information is generated, which represents the degree of localization precision achieved in the localization in step 720. Finally, in a step 740 the precision information is outputted to the control device interface to the data processing device.

If an exemplary embodiment has an "and/or" linkage between a first feature and a second feature, this is to be read as meaning that according to a specific embodiment the exemplary embodiment has both the first feature and the second feature, and according to a further specific embodiment the exemplary embodiment has either only the first feature or only the second feature.

What is claimed is:

1. A method for providing an item of localization information for the localization of a further vehicle at a localization location, the method comprising:
   receiving, from a first vehicle by a vehicle-external server of a central backend system via a wireless communication network: (i) an item of precision information that represents a degree of localization precision achieved by the first vehicle in a localization at the localization location of the first vehicle, and (ii) an item of landmark information that represents at least one landmark used by the first vehicle in the localization of the first vehicle;
   determining, by the server, a deviation between the degree of localization precision and a reference degree of precision; and
   transmitting by the server over the wireless communication network via a wireless communication interface of the server, as a function of the deviation, the item of localization information to an interface at the further vehicle, wherein the item of localization information is an item of information representing the landmark used by the first vehicle in the localization of the first vehicle;
   wherein the further vehicle is different than the first vehicle.

2. The method as recited in claim 1, further comprising:
   receiving, from a third vehicle by the server via the wireless communication network, at least one third item of precision information, the third item of precision information representing a degree of localization precision achieved in the localization of the third vehicle at a third localization location; and
   transmitting, by the server over the wireless communication network via the wireless communication interface of the server, at least one third item of localization information for localizing the further vehicle at the third localization location to the interface of the further vehicle, using the third item of precision information;
   wherein the third vehicle different than the first vehicle and the further vehicle.

3. The method as recited in claim 2, further comprising:
   creating, by the server, a digital precision map using the item of precision information and the third item of precision information, at least one of the item of localization information, and the third item of localization information being transmitted to the further vehicle by the server, using the digital precision map.

4. The method as recited in claim 3, further comprising:
   receiving from the first vehicle by the server via the wireless communication network, an item of sensor information that represents at least one sensor used in the localization of the first vehicle and receiving from the third vehicle by the server via the wireless communication network, an item of sensor information that represents at least one sensor used in the localization of the third vehicle, the digital precision map being created in the step of creating, using the item of sensor information from the first vehicle and the item of sensor information from the second vehicle.

5. The method as recited in claim 1, further comprising:
   receiving, from an additional vehicle by the server via the wireless communication network, at least one additional item of precision information that represents a degree of localization precision achieved in a localization of the additional vehicle at the localization location, the item of localization information being transmitted by the server to the interface of the further vehicle using the additional item of precision information;
   wherein the additional vehicle is different than the first vehicle and the further vehicle.

6. The method as recited in claim 5, further comprising:
   ascertaining, by the server, an average degree of localization precision relating to the localization location using the item of precision information and the additional item of precision information, the item of localization information being transmitted, by the server, as a function of the average localization precision.

7. The method as recited in claim 1, further comprising:
   receiving over the wireless communication network, by the further vehicle using a wireless communication interface, the item of localization information; and
   localizing, using a control unit of the further vehicle, the further vehicle at the localization location using the received item of localization information.

8. The method as recited in claim 7, further comprising:
controlling, by the control unit of the further vehicle, the further vehicle based on the localization of the further vehicle at the localization location, the controlling including controlling: (i) an engine control device of the further vehicle, (ii) a steering actuator of the further vehicle, or (iii) a brake actuator of the further vehicle.

9. A method for providing at least one item of information for the localization of a further vehicle by a first vehicle, the method comprising:
reading in, by a control unit of the first vehicle, an environmental sensor signal that represents a signal produced by an environmental sensor of the first vehicle, wherein the control unit includes hardware;
localizing, using a control unit, the first vehicle at a localization location using the environmental sensor signal, the control unit localizing the first vehicle further using: (i) information regarding a landmark sensed by the environmental sensor of the first vehicle and extracted from the environmental sensor signal, and (ii) a digital map;
ascertaining, by the control unit, a degree of localization precision achieved in the localization of the first vehicle to obtain an item of precision information; and
transmitting over a wireless communication network via a wireless communication interface of the first vehicle, the item of precision information and an item of landmark information that represents the landmark used by the first vehicle in the localization of the first vehicle to a vehicle-external data processing device including a server for providing an item of localization information for the localizing of the further vehicle at the localization location using the item of precision information.

10. The method as recited in claim 9, further comprising:
ascertaining, by the control unit, an item of information that represents at least one sensor used in the localization of the first vehicle, the item of sensor information being to the vehicle-external data processing device over the wireless communication network via the wireless communication interface of the first vehicle in the transmitting step.

11. A vehicle-external server of a central backend system configured to provide an item of localization information for the localization of a further vehicle at a localization location, the server configured to:
receive, from a first vehicle via a wireless communication network: (i) an item of precision information that represents a degree of localization precision achieved by the first vehicle in a localization at the localization location of the first vehicle, and (ii) an item of landmark information that represents at least one landmark used by the first vehicle in the localization of the first vehicle;
determine a deviation between the degree of localization precision and a reference degree of precision; and
transmit over the wireless communication network via a wireless communication interface of the server, as a function of the deviation, the item of localization information to an interface at the further vehicle, wherein the item of localization information is an item of information representing the landmark used by the first vehicle in the localization of the first vehicle;
wherein the further vehicle is different than the first vehicle.

12. A non-transitory machine-readable storage medium on which is stored a computer program for providing an item of localization information for the localization of a further vehicle at a localization location, the computer program, when executed by a computer, causing the computer to perform:
receiving, from a first vehicle by a vehicle-external server of a central backend system via a wireless communication network: (i) an item of precision information that represents a degree of localization precision achieved by the first vehicle in a localization at the localization location of the first vehicle, and (ii) an item of landmark information that represents at least one landmark used by the first vehicle in the localization of the first vehicle;
determining, by the server, a deviation between the degree of localization precision and a reference degree of precision; and
transmitting by the server over the wireless communication network via a wireless communication interface of the server, as a function of the deviation, the item of localization information to an interface at the further vehicle, wherein the item of localization information is an item of information representing the landmark used by the first vehicle in the localization of the first vehicle;
wherein the further vehicle is different than the first vehicle.

* * * * *